Feb. 13, 1934.    E. J. SELLERS    1,947,141
FLY CASTING BASKET REEL
Filed April 26, 1933
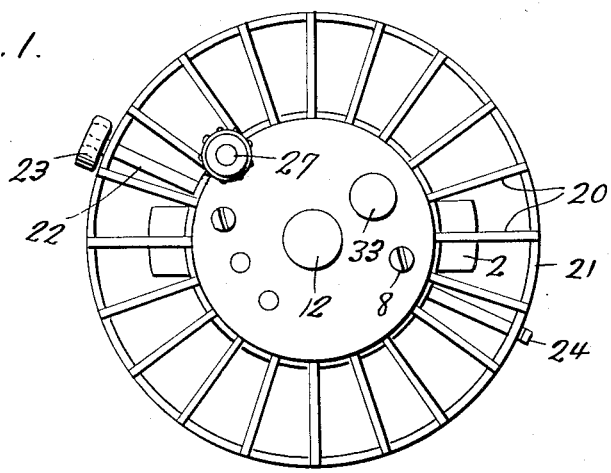
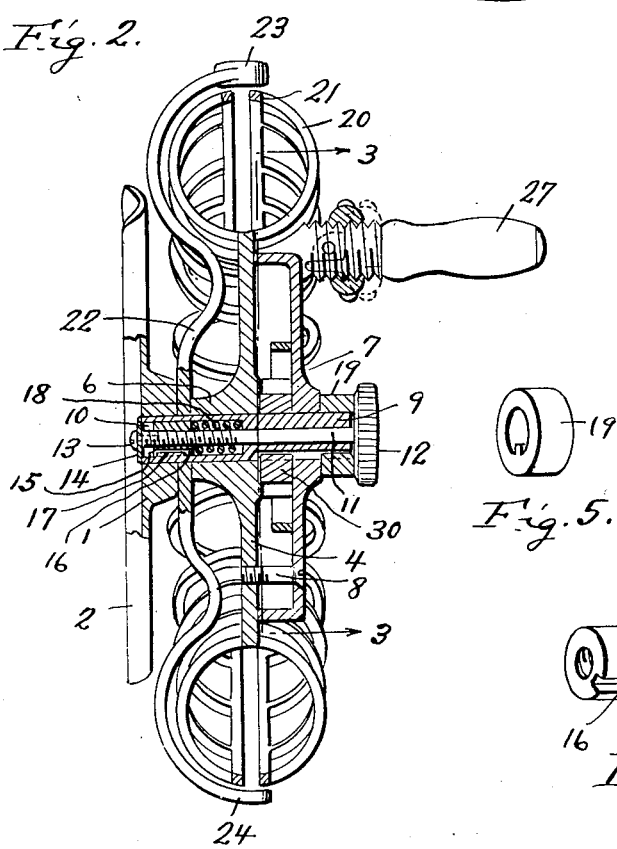
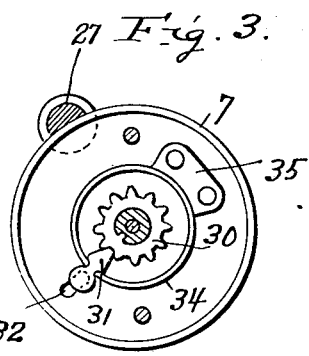
Inventor
*Elmer J. Sellers.*
By *Clarence A. O'Brien*
Attorney Patented Feb. 13, 1934

1,947,141

UNITED STATES PATENT OFFICE 1,947,141

FLY CASTING BASKET REEL

Elmer J. Sellers, Kutztown, Pa.

Application April 26, 1933. Serial No. 668,132

2 Claims. (Cl. 242—84.6)

This invention relates to a fly casting basket reel, the general object of the invention being to provide means whereby the line can be very rapidly wound upon the reel and when so wound, will quickly dry as it is exposed to the air and sunlight and also to provide a reel which lies close to the pole and occupies but little space so that it can be carried in the pocket of the user.

Another object of the invention is to provide a stationary ratchet for the click mechanism and to have the dog rotate about the same, with simple means for imparting the drag to the reel or removing the drag.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a front view of the reel.

Figure 2 is a vertical sectional view thereof.

Figure 3 is a section on line 3—3 of Figure 2.

Figure 4 is a view of the drag bushing.

Figure 5 is a view of the small bushing, placed between the top of the casing and the head of the drag screw.

In this drawing, the numeral 1 indicates the base of the reel which is provided with the grooved elongated part 2 for contacting a part of the pole and which is engaged by the usual rings for fastening the reel to the pole. A disk 4 is provided with an enlarged hub 6 and a casing 7 is fastened to the outer face of the disk by the screws 8. The axle is shown at 9 and passes through the base 1, the hub 6 and through the casing. The inner or rear end of the axle is formed with a chamber 10 which opens out through the rear or inner end of the axle and this end of the axle is welded or otherwise fastened to the base 1. A long screw or bolt 11 passes through the axle and the chamber and has a knurled head 12 at its front end and a threaded socket in its other end into which is screwed a small screw 13 which holds a washer 14 in position closing the end of the chamber 10. A bushing 15 is located in the chamber and has a threaded bore through which the threaded part of the screw 11 passes and this bushing is provided with a keyway 16 for receiving a key 17 attached to a wall of the chamber so that the bushing has sliding movement in the chamber, but cannot rotate. Thus when the screw 11 is turned, the bushing is moved longitudinally in the chamber. A spring 18 is located in the chamber between the inner end thereof and the bushing 15 and is compressed by the bushing when said bushing is moved outwardly or toward the head of the screw. A second bushing or sleeve 19 is keyed to the front or outer end of the axle 9 and is located between the casing 7 and the head of the screw. Thus by turning the screw 11 in one direction, the spring will be compressed and thus a drag will be imparted to the reel disk 6 and the casing 7 which are, of course, rotatably arranged on the axle. The bushing 19 does not turn with the parts, but is held stationary with the axle.

A plurality of semi-circular bars 20 is arranged in two sets, one set being opposite the other, with their inner ends fastened to the periphery of the disk 4 and their outer ends spaced apart, with a ring 21 attached to the outer ends of each set. Thus these two sets of curved bars 20 and their rings 21 form a circular basket for receiving the line. A curved arm 22 is fastened to the base 1 and is located between the base and the hub 6 and the axle passes through the central part thereof. One end of this curved arm carries the eye 23 in which is located the usual agate through which the line passes and as will be seen, this eye is located opposite the space formed by the two rings 21. The other end of the arm is also curved about the inner portion of the basket with its extremity 24 covering the space between the two rings 21 so as to prevent the line or parts thereof from falling out of the basket. Any suitable form of handle 27 is provided for the reel.

A ratchet 30 is located in the casing 7 and is keyed to the axle that it will not rotate and a dog 31 has its stem passing through the radial slot 32 in the top of the casing so that by moving the button 33 attached to the stem of the dog inwardly, the dog will engage the ratchet so as to impart a clicking sound to the reel as the same rotates and by moving the button outwardly, the dog will free itself of the ratchet so that the reel can run free. A ring-shaped spring 34 is fastened to the casing by a bracket 35 and this ring is split with its ends engaging notches in the dog, as shown in Figure 3. As will be seen, the spring and the dog rotate with the reel, but the ratchet remains stationary.

Thus I have provided a simple form of reel which is very fast winding and the drag can be easily applied by turning the screw 11 by its head 12 and this screw also acts to hold the parts together and the spring and movable bushing of the drag are hidden from view. All the parts are connected together so that there is no danger of losing them.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A reel of the class described comprising a base, an axle connected with the base and having a chamber therein, a spring in the chamber, a non-rotatable member in the chamber, a screw passing through the axle and threaded to the member for moving the same longitudinally as the screw is turned, a reel disk rotatably arranged on the axle, a basket line container of annular form connected to the disk, a casing fastened to the outer face of the disk for rotating therewith and also rotating on the axle and a collar carried by the axle and located between the head of the screw and the casing, turning of the screw in one direction causing the compression of the spring by the member for exerting a drag on the reel.

2. A reel of the class described comprising a base, an axle carried thereby, a reel rotatably arranged on the axle and including a disk and two sets of spaced substantially semi-circular bars connected to the periphery of the disk, one set of bars being oppositely arranged to the other set, a ring connecting the outer ends of each set of bars together, the rings being spaced apart, an arm connected with the base and having one end curving around the rear set of bars and formed with an eye which aligns with a part of the space between the two rings for guiding the line into and from the basket formed by said two sets of bars and rings and said arm having its other end curving about another part of the basket and terminating beyond the space between the two rings, said last mentioned end of the arm being diametrically opposite the eye and the space formed by the two rings being entirely unobstructed, with the exception of those parts covered by the eye and the opposite end of the arm, whereby parts of the line can pass through that portion of the space between the two rings between the eye and said opposite end of the arm.

ELMER J. SELLERS.